United States Patent [19]

Ishigami

[11] Patent Number: 5,162,871
[45] Date of Patent: Nov. 10, 1992

[54] FIBER OPTIC GYRO USING ALTERNATING BIAS PHASE AND BIAS CORRECTION

[75] Inventor: Motohiro Ishigami, Tokyo, Japan

[73] Assignee: Japan Aviation Electronics Industry Limited, Tokyo, Japan

[21] Appl. No.: 717,898

[22] Filed: Jun. 19, 1991

[30] Foreign Application Priority Data

Jun. 29, 1990 [JP] Japan ................... 2-172367

[51] Int. Cl.$^5$ ............................................. G01C 19/72
[52] U.S. Cl. ............................................. 356/350
[58] Field of Search .................... 356/350, 345; 372/94

[56] References Cited

U.S. PATENT DOCUMENTS

| | | | |
|---|---|---|---|
| 4,591,269 | 5/1986 | Mohr | 356/350 |
| 4,759,629 | 7/1988 | Everest et al. | 356/350 |
| 4,871,254 | 10/1989 | Lefevre et al. | 356/350 |

Primary Examiner—Samuel A. Turner
Attorney, Agent, or Firm—Pollock, VandeSande and Priddy

[57] ABSTRACT

In a fiber optic gyro, a clockwise propagating light ray and a counterclockwise propagating light ray propagate in an optical fiber coil in a time of $\tau$, and are given a bias phase modulation signal by a phase modulator connected at an end of said optical fiber coil, in such a manner that a phase shift increasing stepwise by $\pi/2$ radian every time interval T is applied n steps and then a phase shift decreasing stepwise by $\pi/2$ radian every time interval T is applied n steps, to the phase modulator. A signal generator generates a bias phase modulation signal every time interval T according to an oscillation frequency of a voltage controlled oscillator. An interference light beam of said clockwise and counterclockwise propagating light rays is converted to an electric signal by an opto-electric converter and, if the time interval T does not coincide with a propagation time, a positive- or negative-going pulse is created in an output of the opto-electric converter during a period for the bias phase modulation signal to increase or decrease. Such a positive- or negative-going pulse is detected by a pulse detector and, based on a detected result, an oscillation frequency of the voltage controlled oscillator is controlled so that said pulses no longer occur.

4 Claims, 10 Drawing Sheets

FIBER OPTIC GYRO USING ALTERNATING BIAS PHASE AND BIAS CORRECTION

BACKGROUND OF THE INVENTION

The present invention relates to a fiber optic gyro in which a clockwise propagating light ray and a counterclockwise propagating light ray are entered into a loop-shaped optical fiber coil and, by taking advantage that a phase difference is caused between said clockwise and counterclockwise propagating light rays according to an input angular rate applied to the optical fiber coil, the input angular rate is detected More particularly, the invention relates to such a portion that modulates the phases of said clockwise and counterclockwise propagating light rays so as to make a phase difference between said clockwise and counterclockwise propagating light rays alternately take $+\pi/2$ radian and $-\pi/2$ radian with an input angular rate of zero, while synchronizing such a phase modulation signal as described above with a light propagation time in the optical fiber coil.

Figure 1:
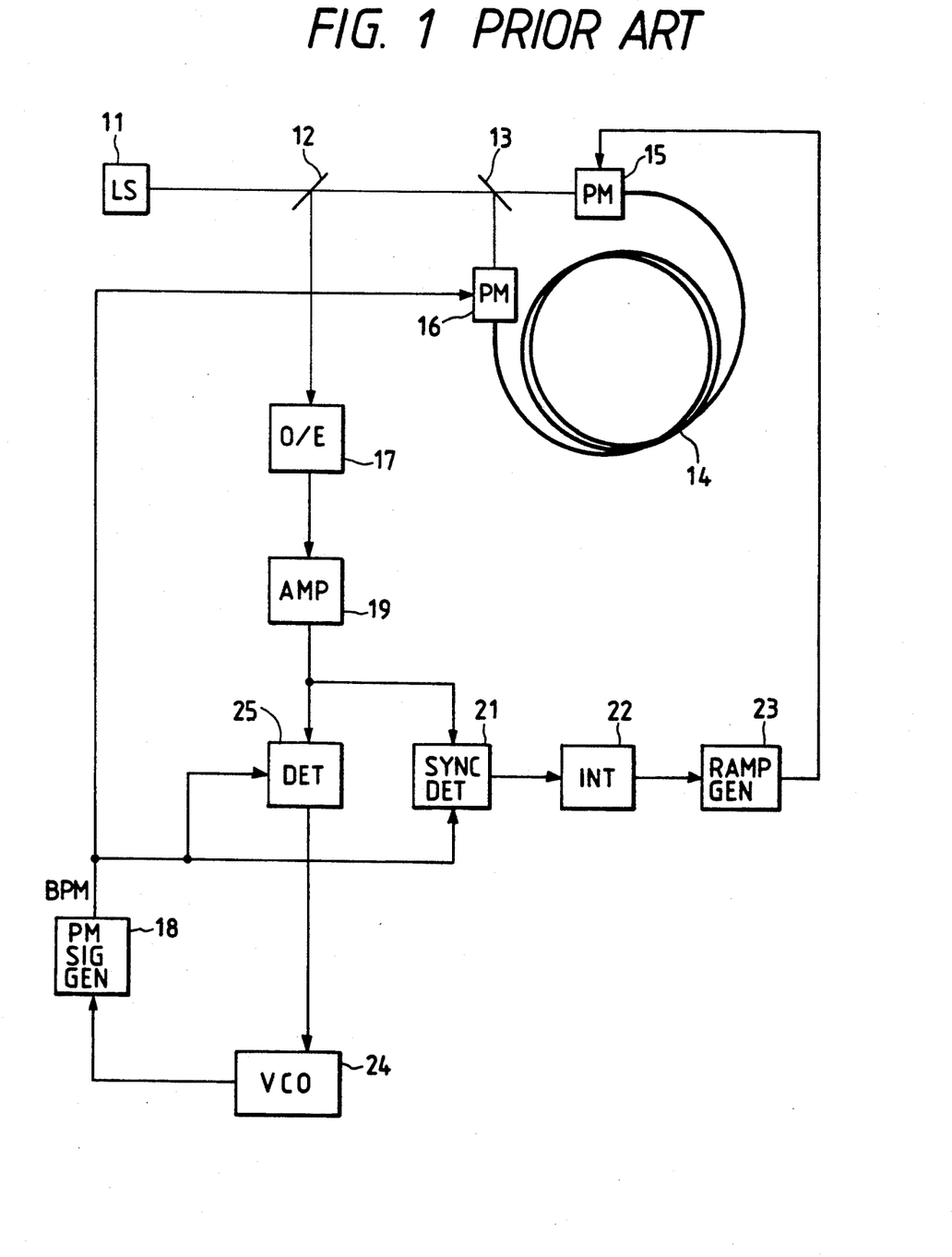
FIG. 1 is a block diagram to show a conventional fiber optic gyro.

FIG. 1 shows an example of a conventional fiber optic gyro. A light beam emitted from a light source 1 is entered into a beam splitter 13 via a beam splitter 12. The light beam is split into two rays by the beam splitter 13 and entered into an optical transmission path (i.e., an optical fiber coil) 14 as a clockwise propagating light ray and a counterclockwise propagating light ray. At that time, the clockwise propagating light ray is entered into the optical fiber coil 14 via a phase modulator 15. The clockwise light ray leaves the optical fiber coil 14 and is transmitted through a biasing phase modulator 16 and then returns to the beam splitter 13. The counterclockwise light ray is transmitted into the phase modulator 16 from the beam splitter 13, then proceeds to the optical fiber coil 14 and, after that, it enters the beam splitter 13 via the phase modulator 15 where the counterclockwise light ray is combined with the clockwise light ray while causing interference therebetween. The again combined interference light beam is entered into the beam splitter 12 from which the beam propagates to an opto-electric converter 17 where the beam is converted to an electric signal FR representing the intensity of the combined light (interference light).

Figure 2:
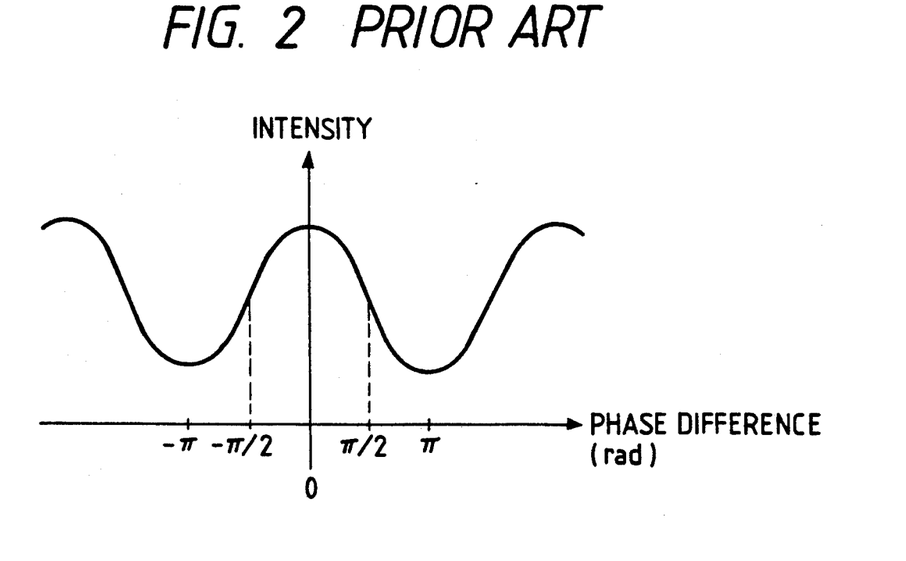
FIG. 2 is a view to show the relationship between the phase difference of a clockwise propagating light ray and the counterclockwise propagating light ray and the output of an opto-electric converter.
Figure 3A:
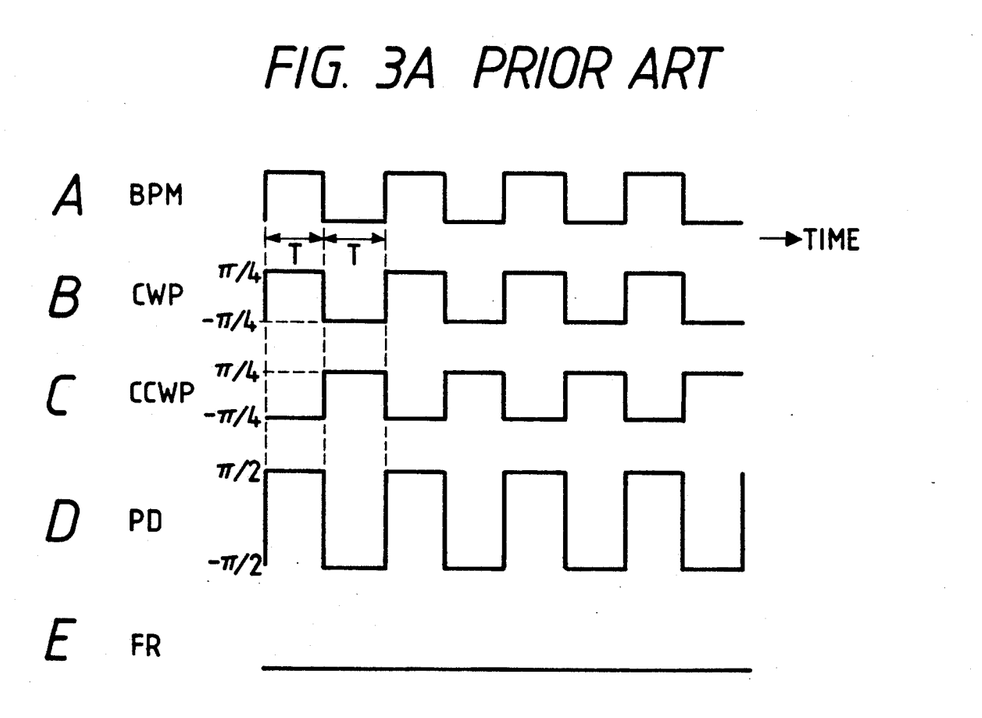
FIG. 3A is a time chart to describe an example of operation at $T=\tau$ in FIG. 1.

In a fiber optic gyro, the relative phase difference between the clockwise light and the counterclockwise light, after returning to the beam splitter 13, is 0 unless the optical fiber coil 14 revolves around an axial center thereof. When the optical fiber coil 14 revolves around the axial center thereof, an irreversible phase shift is created between the clockwise light and the counterclockwise light owing to the Sagnac effect while resulting in a change of the intensity of the combined light (interference light) detected by the opto-electric converter 17, because of said phase shift. Said phase difference and the change in the intensity of the combined light (interference light) takes a relationship as shown in FIG. 2 as represented by a sine function. The magnitude and direction of the change in the intensity of said interference light are detected in order to detect an input angular rate. According to the prior art, in order to have the fiber optic gyro actuated at a most sensitive operating point, for example, at the point of a phase difference of $\pm\pi/2$ radian, a phase modulation signal BPM in a rectangular wave with a period of 2T is generated from a phase modulation signal generator 18. The biasing phase modulator 16 is thereby activated to give phase shifts of $\pi/4$ radian and $-\pi/4$ radian alternately in light signals. The time interval T is made equal to a light propagation time T through the optical fiber coil 14. Therefore, as shown in Rows B and C of FIG. 3A, when the clockwise light ray and the counterclockwise light ray return to the beam splitter 13, the phases of both light rays are shifted by $\pi/4$ radian (CWP) and $-\pi/4$ radian (CCWP), respectively at the same time. Consequently, the phase difference between both light rays repeatedly becomes $\pi/2$ radian and $-\pi/2$ radian in a cycle time of T each, as shown in Row D of FIG. 3A. Obviously in FIG. 2, the sensitivity becomes maximum at phase differences of $\pi/2$ and $-\pi/2$ and, at these operating points, the interference light takes the same level of optical intensity. Therefore, the level of an output FR from the opto-electric converter 17 becomes stationary as shown in Row E of FIG. 3A.

The output FR of the opto-electric converter 17 is amplified by an amplifier 19 and the amplified output thereof is synchronously detected by the output of the phase modulation signal generator 18 in a synchronous detector 21. The synchronous detector 21 issues an output signal that shows the magnitude and direction of a phase shift in relation to the bias phase modulation signal BPM. Said output signal is integrated in an integrator 22, and an integrated output thereof is supplied to a ramp voltage generator 23 which issues a ramp signal output having a slope and polarity according to the input thereto. Said ramp signal output activates the phase modulator 15 which generates a phase difference cancelling the phase difference induced due to the Sagnac effect between the clockwise light and the counterclockwise light. At that time, by measuring the frequency and plurality of the ramp voltage signal by a means not illustrated, the magnitude and direction of the input angular rate are obtained.

Figure 3B:
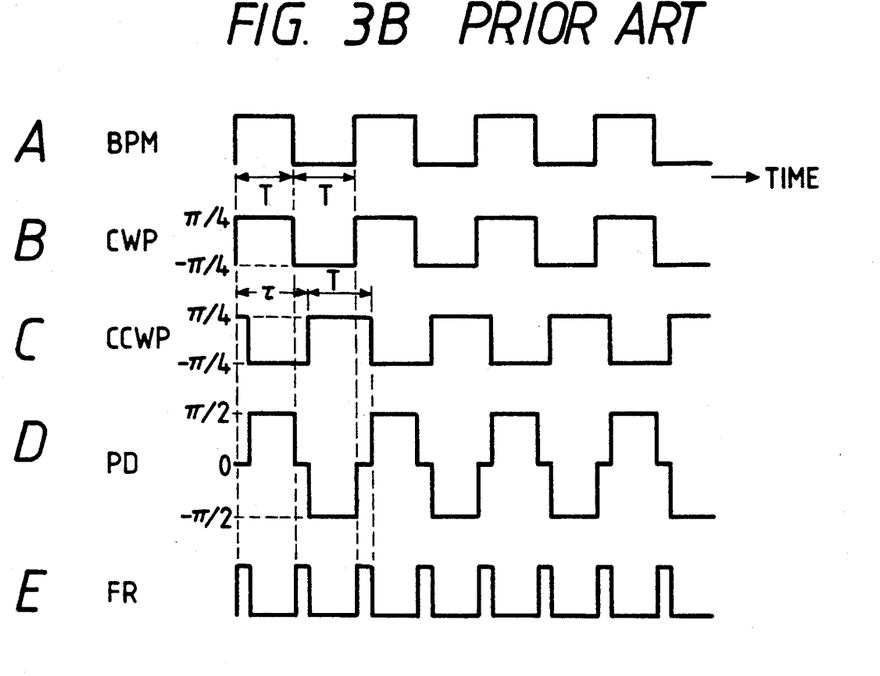
FIG. 3B is a time chart to describe an example of operation at $T<\tau$ in FIG. 1.
Figure 3C:
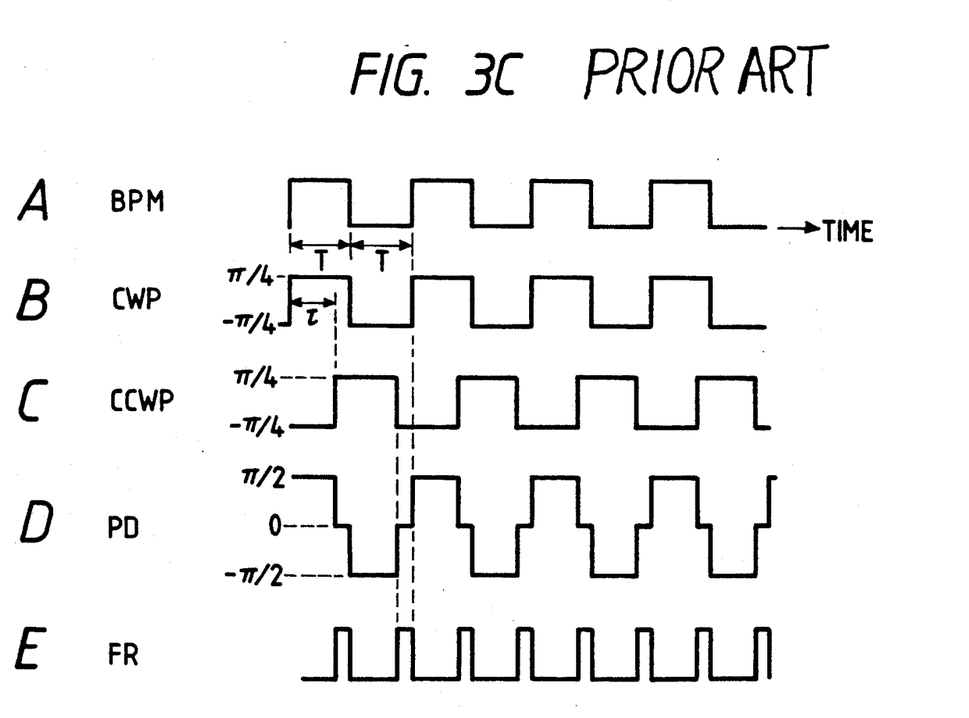
FIG. 3C is a time chart to describe an example of operation at $T>\tau$ in FIG. 1.

If the time interval T used to modulate phases is smaller than a propagation time r through the optical fiber coil 14 in the case where an input angular rate is zero, phase modulations CWP and CCWP effected to both light rays returned to the beam splitter 13 take such a relationship as the phase of the counterclockwise light lags by T ($\pi$ radians) or more from that of the clockwise light, as shown in Rows B and C of FIG. 3B. Therefore, the phase difference PD between these light rays become zero in between $\pi/2$ radian and $-\pi/2$ radian. Correspondingly, the output FR of the opto-electric converter 17 becomes a series of pulses as shown in Row E, as revealed from the output-phase difference curve of FIG. 2. When the time interval T of phase modulation is larger than the propagation time $\pi$, phase modulations CWP and CCWP received by both light rays returned to the beam splitter 13 are such that the counterclockwise light lags by T ($\pi$ radian) or less from the clockwise light. The phase difference between both light rays becomes zero between $\pi/2$ radian and $-\pi/2$ radian, in some periods of time where the pulses in the output FR of the opto-electric converter 17 become maximum as shown in Row E.

When the time interval T is not equal to $\tau$ as described above, pulses larger than the level at a phase difference of $\pi/2$ radian are generated as an output from the opto-electric converter 17, as if there is an input angular rate which does not actually exist As a result, operation error occurs. Consequently, according to conventional systems, the bias phase modulation signal BPM was generated by the phase modulation signal generator 18 using an output from a voltage controlled oscillator 24. In addition, the output from the amplifier 19 and the bias phase modulation signal BPM of the phase modulation signal generator 18 were supplied to the detector 25. Thus, it was detected whether a pulse in the output FR of the opto-electric converter 17 occurred after or before a rising edge of the phase modulation signal BPM. A detected output controlled the voltage controlled oscillator 24 to make an oscillation frequency of the voltage controlled oscillator 24 lower if said pulse existed thereafter. If said pulse existed before the rising edge, the oscillation frequency of the voltage controlled oscillator 24 was made higher Thereby, it was managed to have no pulse generated from the opto-electric converter 17, that is to make $T=\tau$.

According to a convention optic gyro as described above, in order to make the bias phase modulation switching time interval T equal to the light propagation time $\tau$ through the optical fiber coil 14, a compensation was effected by detecting when a pulse generated in the output of the photo electric converter 17 occurred in relation to an edge of the bias phase modulation signal. However, the frequency band of the photoelectric converter 17 is not always wide enough. Therefore, the output pulse of the opto-electric converter 17 may be subjected to waveform distortion or delay, causing an error in it timing relative to the phase modulation signal and making it difficult to precisely compensate the time interval T.

SUMMARY OF THE INVENTION

It is therefore an object of the present invention to provide a fiber optic gyro in which a switching time interval T for a bias phase modulation can be in precise agreement with a propagation time $\tau$.

According to the present invention, a phase modulation signal generator repeats to generate a phase modulation signal which is stepped up by a magnitude corresponding to a phase shift of $\pi/2$ radian at every time interval T for n steps (where n is an integer of two or larger) and then stepped down by said magnitude corresponding to a phase shift of $\pi/2$ radian at every time interval T for n steps, a biasing phase modulator is supplied with said phase modulation signal where it is detected during a said phase modulation signal increasing or decreasing period whether there is either a positive-going pulse or a negative-going pulse in an output of the opto-electric converter, and the time interval T is compensated in such a manner that said positive-going pulses or said negative-going pulses no longer occur in response to the detection of said positive-going pulse or said negative-going pulse.

DETAILED DESCRIPTION OF THE PREFERRED EMBODIMENTS

Figure 4:
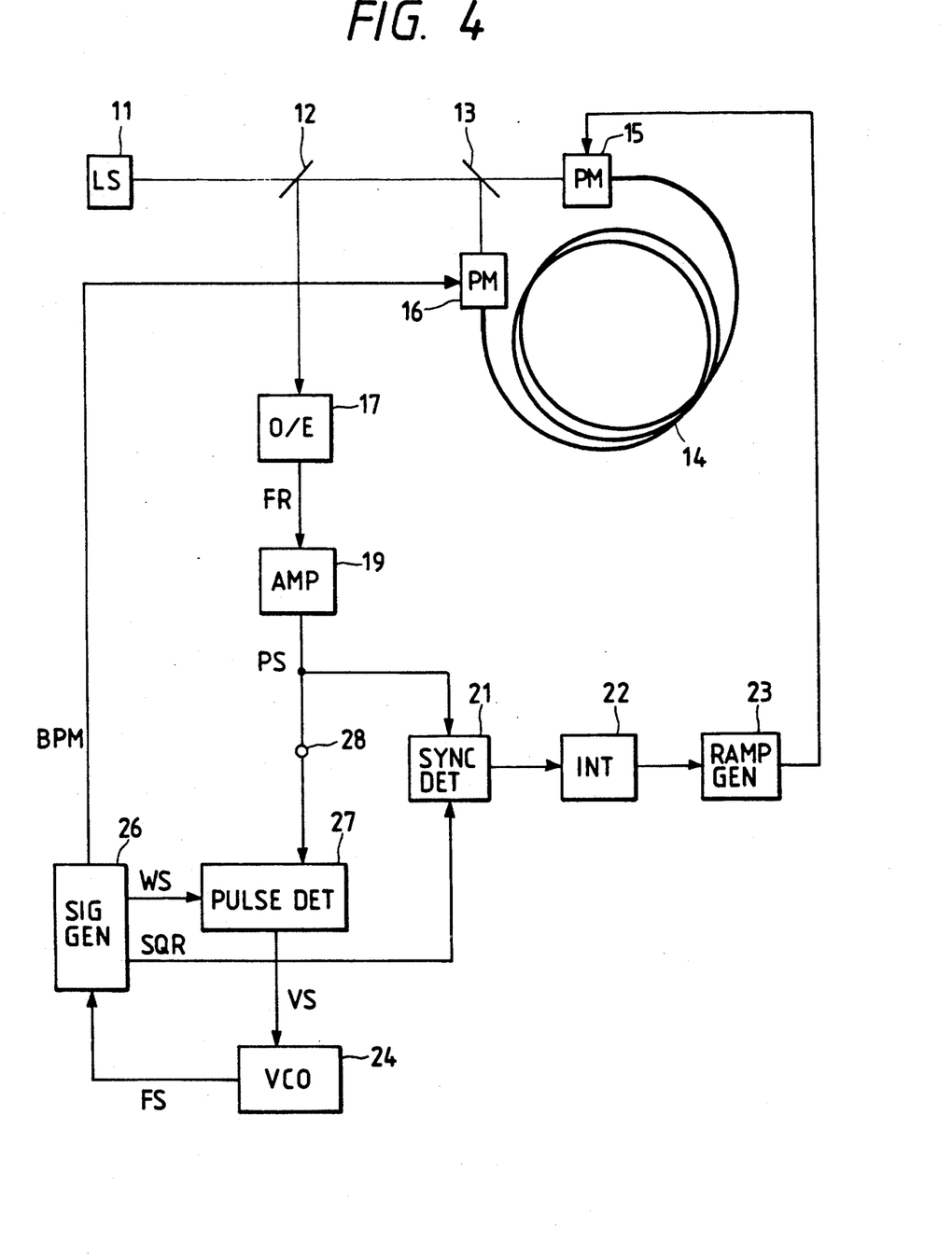
FIG. 4 is a block diagram showing an embodiment of the present invention.

FIG. 4 shows an embodiment of the present invention depicting parts corresponding to those shown in FIG. 1 using the same numerals. In the present invention, a signal generator 26 generates a bias phase modulation signal BPM which is stepped up by a magnitude Vb corresponding to a phase shift of $\pi/2$ radian at every time interval T for n steps (for example, n=3 in FIGS. 5A and 5B) and then stepped down by said magnitude Vb at every time interval T for n steps, as shown in Row A of FIG. 5A. Said phase modulation signal BPM actuates biasing phase modulator 16. Therefore, when the time interval T is equal to a propagation time $\tau$ through an optical fiber coil 14, the phase modulation CWP received by a clockwise light ray returned to a beam splitter 13 in the state of a zero input angular rate becomes as shown in row B of FIG. 5A, while the phase modulation CCWP received by the counterclockwise light ray delays by the time interval $T=\tau$ from the phase modulation CWP received by the clockwise light ray, as shown in Row C of the same figure. Consequently, the phase difference PD of both light rays alternately take $\pi/2$ radian and $-\pi/2$ radian at every nT (n=3), a transition point also alternately being a point for the bias phase modulation signal BPM to begin increasing or decreasing.

Figure 5A:
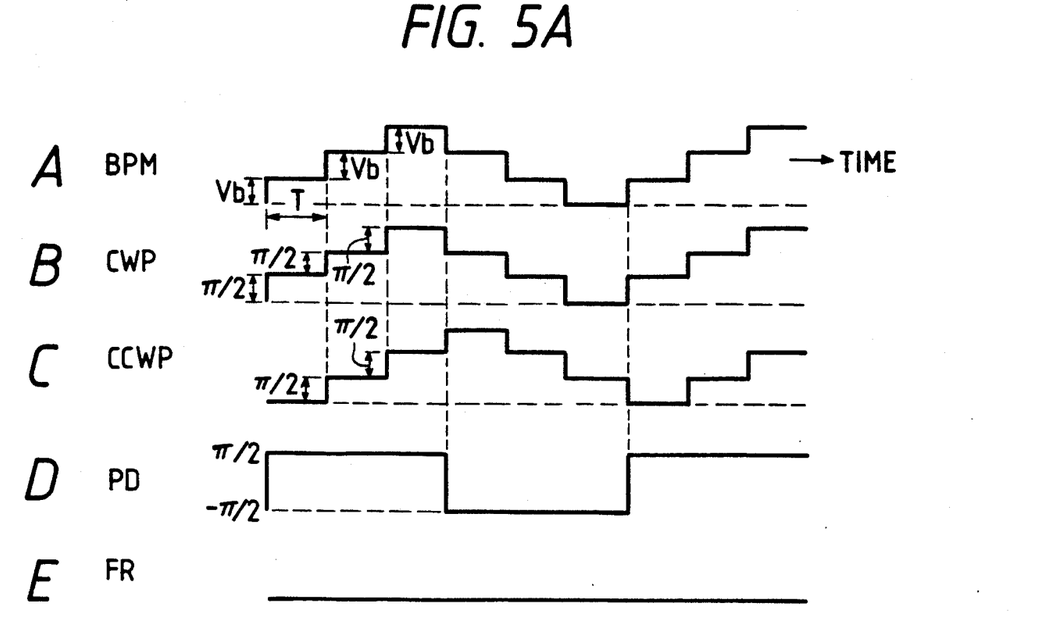
FIG. 5A is a time chart to describe an example of operation at $T=\tau$ in FIG. 4.

Therefore, the signal generator 26 generates a rectangular reference signal SQR in synchronization with phase difference signal PD between both light rays as shown in FIG. 5A, in a period of 2nT, with which an output PS of amplifier 19 is synchronously detected in synchronous detection circuit 21. In the case of $T=\tau$ with a zero input angular rate, output FR from the opto-electric converter 17 takes a stationary level as shown in Row E of FIG. 5A, in the same manner as known in the prior art. When an angular rate is entered in this state, a modulation which cancels the phase difference caused by the Sagnac effect between the clockwise and counterclockwise propagating light rays is given to the phase modulator 15, and thereby the input angular rate is measured.

In the case where the time interval T of the biasing phase modulation signal is smaller than the propagation time t through the optical fiber coil 14, phase modulation CCWP received by the counterclockwise light lags phase modulation CWP received by the clockwise light returned to the beam splitter 13, by $T+\Delta T$. Consequently, the phase difference PD between both light rays is mainly $\pi/2$ radian in a section where phase modulations CWP and CCWP repeat the steps of $+\pi/2$ radian (increasing section). However, there are sections ΔT where the phase difference PD becomes π radians at every T. Likewise, in a section where phase modulations CWP and CCWP repeat the steps of −π/2 radian (decreasing section), the PD is mainly −π/2 radian with such a section ΔT as it becomes −π/2 radian every T. In addition, immediately after a transition between increasing and decreasing sections, there is a section wherein a phase difference and a length are zero and ΔT, respectively. The output FR of the opto-electric converter 17 takes a maximum, a minimum and a stationary value when the phase difference is zero, ±π and ±π/2, respectively. As a result, negative-going pulses are created in the output FR of the opto-electric converter 17 in the increasing and decreasing sections as shown in Row E of FIG. 5B.

Figure 5B:
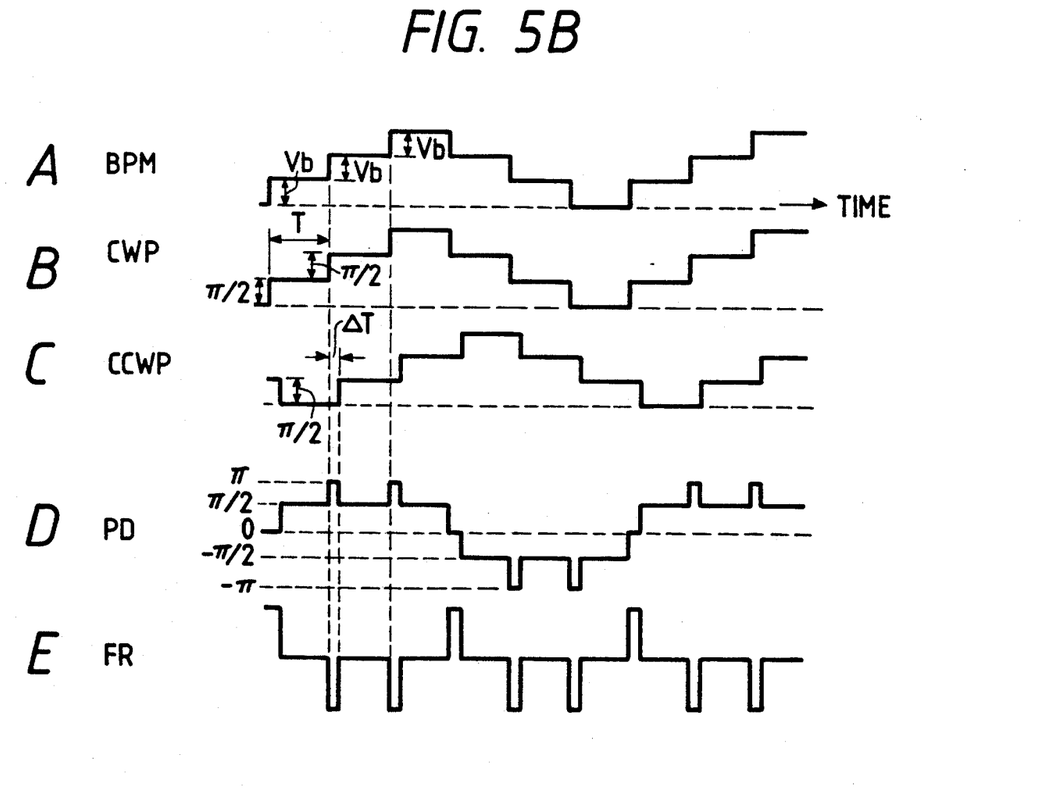
FIG. 5B is a time chart to describe an example of operation at $T=\tau$ in FIG. 4.
Figure 5C:
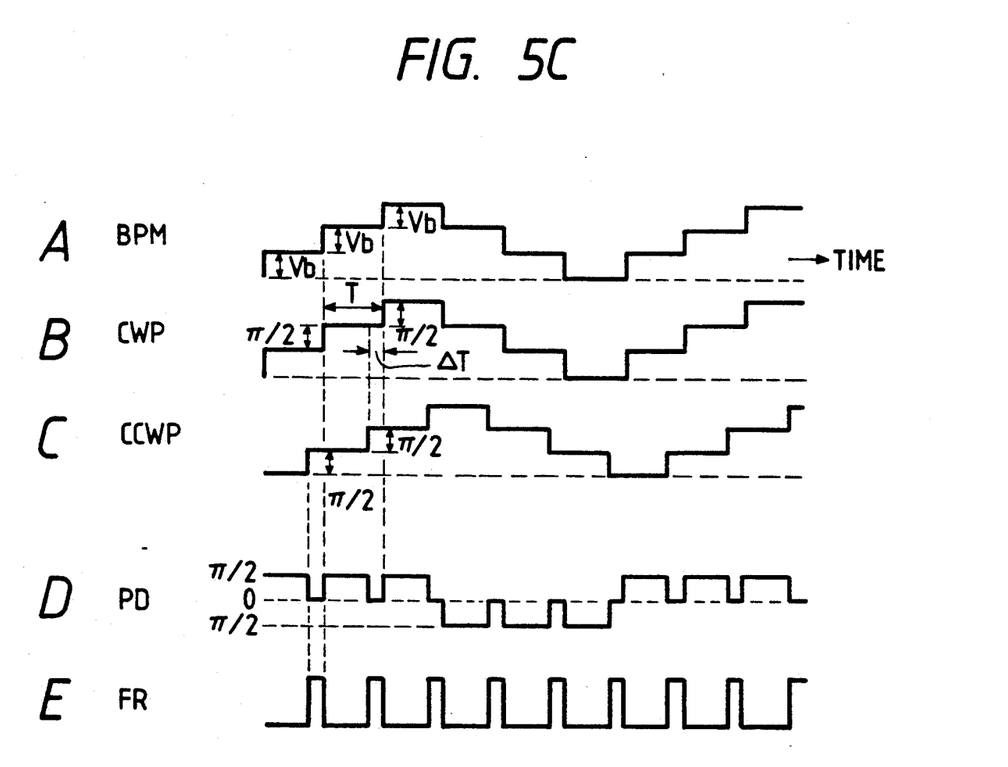
FIG. 5C is a time chart to describe an example of operation at $T>\tau$ in FIG. 4.

When the time interval T is larger than the propagation time τ, the phase modulation CCWP received by the counterclockwise light lags by T−ΔT from the phase modulation CWP received by the clockwise light returned to the beam splitter 13 with a zero input angular rate, as shown in FIG. 5C. Phase differences PD of both light rays mainly take π/2 radian, in an increasing section but a section wherein a phase difference and a time length thereof are zero and ΔT, respectively is repeated every T. Likewise, in a decreasing section, phase differences PD mainly take −π/2 radian but the section of a zero phase difference and a ΔT length is repeated every, T. Therefore, a pulse of ΔT in width and having a maximum level is created every T. More explicitly, as shown in Row E of FIG. 5C, a positive-going pulse is created in either an increasing or a decreasing section.

According to the present invention, therefore, a pulse detector 27 is used to detect whether there is either a negative-going pulse or a positive-going pulse in an increasing or decreasing section of the biasing phase modulation signal BPM. If a negative-going pulse is detected, voltage controlled oscillator 24 is controlled to have no negative-going pulses generated by a detection output VS thereof. That is, the oscillation frequency of the voltage controlled oscillator 24 is made lower. When a positive-going pulse is detected, the voltage controlled oscillator 24 is controlled accordingly so that positive-going pulses are generated. That is, the oscillation frequency of the voltage controlled oscillator 24 is made higher.

Figure 6:
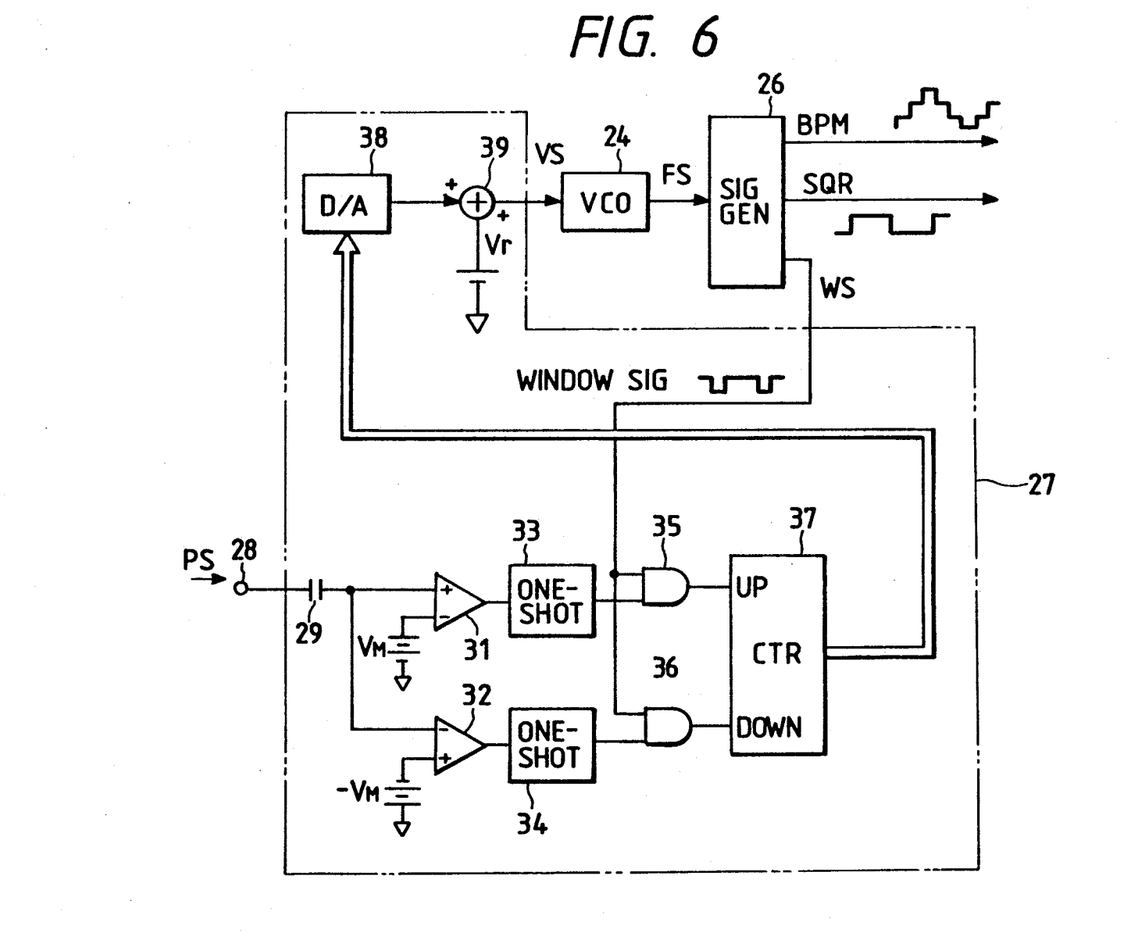
FIG. 6 is a block diagram to show an embodiment of the pulse detector 27 in FIG. 4.
Figure 7:
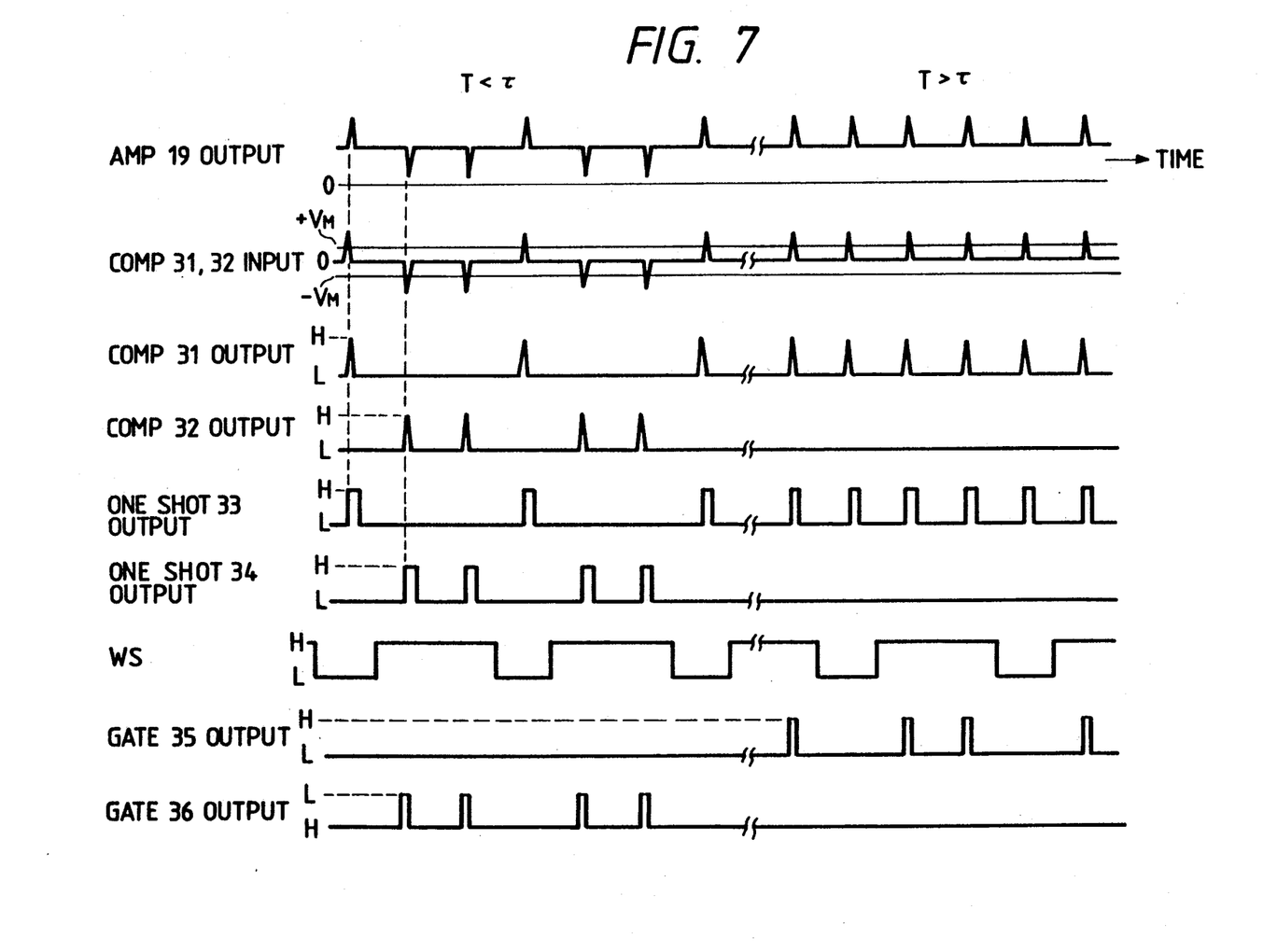
FIG. 7 is a time chart to show an example of operation thereof.

The pulse detector 27 can be composed as shown in FIG. 6 for example. More explicitly, an output PS of the amplifier 19 in FIG. 4 is supplied to a non-reversing input terminal of a comparator 31 and a reversing input terminal of a comparator 32, from a terminal 28 after cutting off DC by a capacitor 29. As shown in an operation time chart of FIG. 7, an input signal PS to the terminal 28 is DC-filtrated corresponding to π/2 radian and −π/2 radian and then compared to voltages $+V_m$ and $-V_m$ in the comparators 31, 32. The voltages $+V_m$ and $-V_m$ are provided to prevent error owing to a phase difference caused by the Sagnac effect. The absolute value of said voltages is made larger than the absolute value of an output corresponding to a phase difference caused by an expected steep angular rate input. Referring to FIG. 7, a positive-going pulse is detected by the comparator 31 and a negative-going pulse is detected in the comparator 32. The width of an output pulse from the comparator 31 or 32 is made constant, if so required, in a oneshot circuit 33 or 34 and the output pulse is supplied to a gate 35 or 36. A window signal WS is supplied from the signal generator 26 to gates 35, 36 to take out pulses in an increasing section and decreasing section for the biasing phase modulation signal BPM, while blocking pulses generated at a transition portion between an increasing section and a decreasing section.

Output pulses from the gate 35 are up-counted in a counter 37 while down-counting output pulses from the gate 36 in the counter 37. When the counter 37 down-counts in the zero state, it counts −1, −2, −3, ---. A value counted by the counter 37 is converted to an analog signal by a DA converter 38. Said analog signal is added to a reference signal Vr in an adder 39 as a compensation signal. An output VS from the adder 39 is supplied to the voltage controlled oscillator (VSO) 24 as a control signal.

In the state of T<τ, as shown in FIG. 5B and the left side of FIG. 7, a negative-going pulse is created in the output PS of the amplifier 19. Said pulse is down-counted in the counter 37 providing a certain negative value as a counting of the counter 37. Corresponding to said counted value, a negative analog signal is supplied to the adder 39 making a control voltage to the VCO 24 smaller than Vr in order to lower the oscillation frequency of the VCO 24. Consequently, time interval T becomes longer and, when T=τ, negative-going pulses go out while maintaining such a state.

In the state of T>τ to the contrary, as shown in FIG. 5C and the right side of FIG. 7, a positive-going pulse is created in output PS of the amplifier 19, and up-counted by the counter 37 providing a certain positive value of counting by the counter 37. According to said counted value, a positive analog signal is supplied to the adder 39 to make the control voltage to the VCO 24 larger than Vr while increasing the oscillation frequency of the VCO 24. Consequently, the time interval T is made shorter and, upon T=τ, no positive-going pulses are generated while holding such a state.

Figure 8:
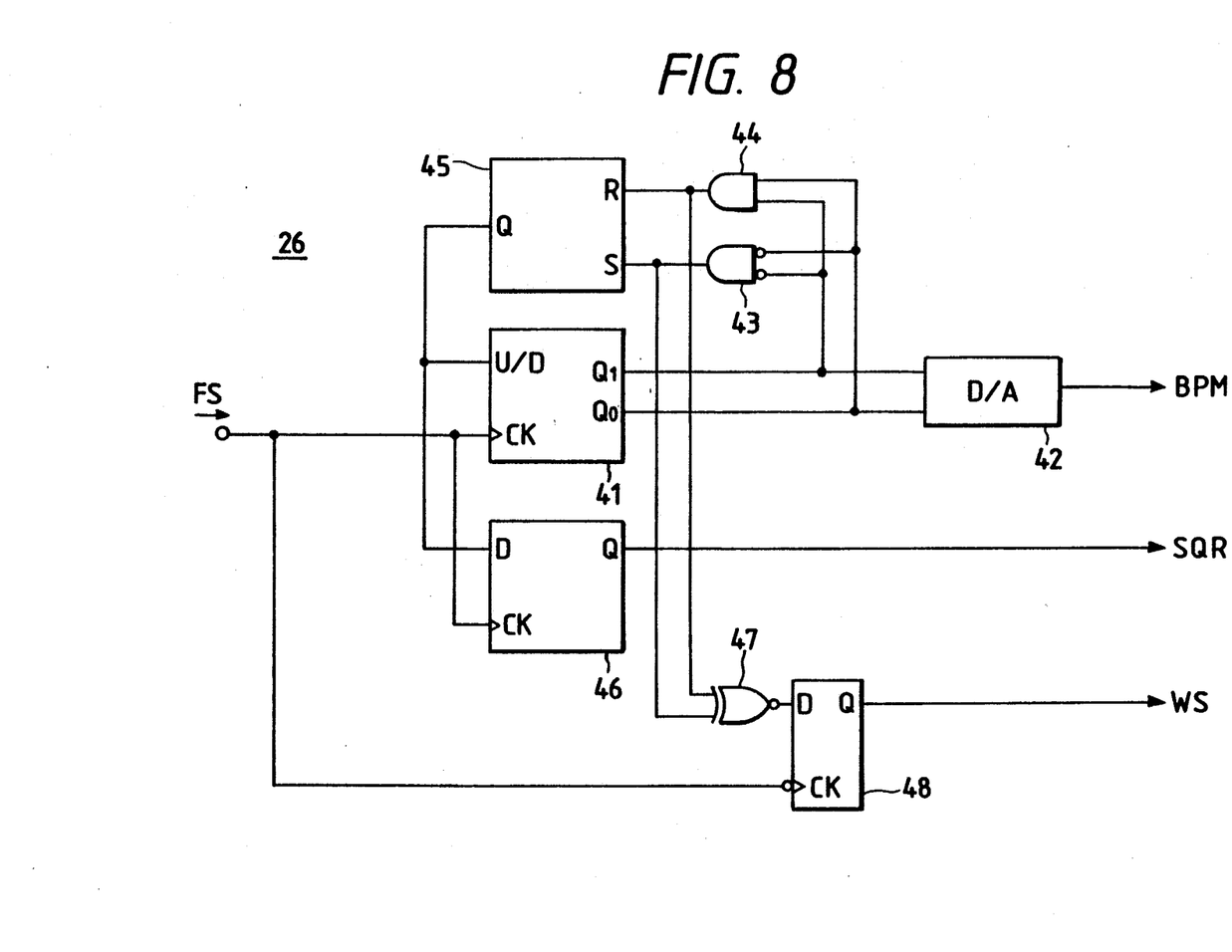
FIG. 8 is a block diagram to show an embodiment of the signal generator 26 in FIG. 4.
Figure 9:
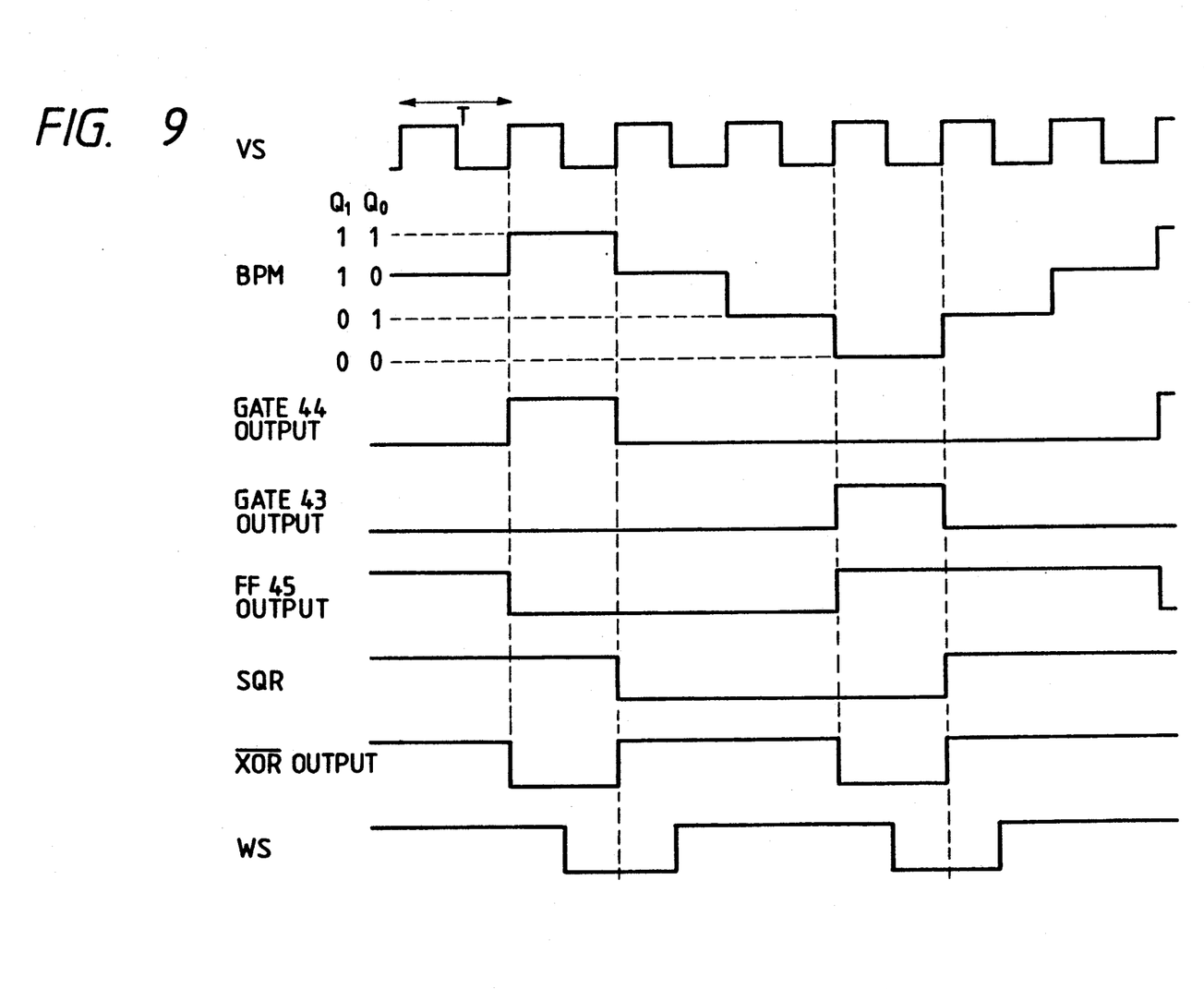
FIG. 9 is a time chart to show an example of operation thereof.

FIG. 8 shows a practical composition of the signal generator 25 in case of N=3 like FIGS. 5A, 5B and 5C and the operation thereof is shown in the time chart of FIG. 9. A signal FS of a period T issued from the voltage controlled oscillator 24 is to a clock terminal CK of the up-down counter 41 which provides counted value "$Q_1Q_0$" to the D-A converter 42.. The D-A converter 42 issues analog voltages zero, V(π/2), V(π) and V(3π/2) with input values "$Q_1Q_0$" of "00", "01", "10" and "11" respectively. Said voltages provide the clockwise light and the counterclockwise light with phase shifts of zero, π/2, π and 3π/2 radians, respectively. A counted value $Q_1Q_0$ of the counter 41 is applied to a NOR gate 43 and an AND gate 44, the outputs of which are given to a set terminal S and a reset terminal R of a flip-flop 45, respectively. As a result, the flip-flop 45 is set only with the counted value "$Q_1Q_0$" of "00", and is reset only with a counted value "$Q_1Q_0$" of "11". With values other than these, the flip-flop maintains its previous state. The up-down counter 41 up-counts pulses of input signal FS when the Q output of the flip-flop 45 is at a high level, while down-counting with a Q output at a low level. Consequently, when counted value "$Q_1Q_0$" of the counter 41 becomes "00", the counter 41 enters an up-count mode, in which the voltage of the phase modulation signal BPM, an output of the DA converter 42, steps up every period of T as shown in FIG. 9 in order to sequentially up-count pulses of the input signal FS. When counted value "$Q_1Q_0$" thereof arrives at "11", the flip-flop 45 is reset to set the counter 41 in a down-count mode in which pulses of the input signal FS are sequentially down-counted. Therefore, the voltage of BPM, an output of the DA converter 42, steps down every period of T.

The Q output of the flip-flop 45 becomes a rectangular wave of a period 2nT (=6T) as shown in FIG. 9. As the flip-flop 46 reads said Q output in the period T of the input signal FS, the same waveform as the Q output waveform of the flip-flop 45 is obtained in the Q output, in a phase delayed by the period T. The Q output of the flip-flop 46 is applied to a synchronous detector 31 as a reference signal SQR. The outputs of the gates 43 and 44 are entered into an $\overline{XOR}$ gate 47. An output from said gate 47 in a signal waveform whose level in becomes in a low level in a period when a reset signal and a set signal are given to the flip-flop 45 while becoming a high level in other periods. Said signal waveform is read into the flip-flop 48 by a reversed pulse of the input signal FS, so a waveform obtained in the Q output is such that the output waveform of the $\overline{XOR}$ gate 47 is delayed by T/2. The waveform thus delayed forms a window signal WS as a level thereof becomes low only during a period T with a center of either a rise edge for the waveform of the phase modulation signal BPM to begin increasing or a fall edge for the same to begin decreasing.

According to the present invention as described above, the phase modulation signal in use is such that the increasing of a magnitude giving a phase shift of $\pi/2$ radian every time interval T is repeated for n steps and then the decreasing of a magnitude to give a phase shift of $\pi/2$ radian every time interval T is repeated n steps. In an increasing section and a decreasing section of the biasing phase modulation signal, it is detected whether there is either a positive-going pulse or a negative-going pulse. If there is a positive-going pulse, the time interval T is shortened accordingly in order that positive-going pulses no longer occur. When there is a negative-going pulse, the time interval T is shortened correspondingly so that negative-going pulses disappear. The method of the present invention is unlike conventional systems where a relative timing of pulses is detected to determine whether the pulses are leading or lagging from an edge of the phase modulation signal. Instead, the present invention discriminates whether a pulse is a positive or negative going one. Therefore, the time interval T can be made precisely in agreement with the propagation time $\tau$ no matter whether the waveform of pulses is distorted or the timing thereof is delayed because the frequency band of the opto-electric converter 17 is not wide enough.

What is claimed is:

1. A fiber optic gyro comprising:
a light source;
a beam splitter for splitting a light beam from said light source into two rays of light;
an optical fiber coil into which said two rays of light from the beam splitter are entered as a clockwise propagating light ray and a counterclockwise propagating light ray;
interfering means for causing said clockwise and counterclockwise propagating light rays emitted from said optical fiber coil to interfere with each other;
an opto-electric converter responsive to an interference light ray from said interfering means, for outputting an electric signal according to the intensity of said interference light ray;
an optical phase modulator inserted between one end of said optical fiber coil and said beam splitter and electrically controlled to shift an optical phase;
said fiber optic gyro also comprising:
phase modulation signal generating means operative to repeatedly generate a phase modulation signal which is stepped up by a magnitude corresponding to a phase shift of n/2 radian at every time interval T for n steps, where n is an integer of two or larger, and which is then stepped down by said magnitude corresponding to a phase shift of n/2 radian at every time interval T for n steps, said phase modulation signal being supplied to send optical phase modulator;
pulse detecting means for detecting whether there is either a positive-going pulse or a negative-going pulse in an output of said opto-electric converter; and
compensating means for compensating said time interval T in such a manner that said positive-going pulses or said negative-going pulses no longer occur corresponding to the detection of said positive-going pulse or said negative-going pulse by said pulse detecting means.

2. The fiber optic gyro of claim 1, wherein said pulse detecting means includes a pulse counting means for up-counting one of said positive-going pulse and said negative-going pulse and down-counting the other of said positive-going pulse or said negative-going pulse;
said compensating means includes a compensation signal generating means for generating a compensation signal based on a numeric value of said pulse counting means; and
said signal generating means includes a voltage controlled oscillation means whose frequency is controlled by said compensation signal, step counter means that repeatedly up-counts an oscillation output pulse of said voltage controlled oscillation means for said n steps and then down-counts said oscillation output pulse for said n steps, and D/A conversion means that receives a counted value from said step counter means and issues said phase modulation signal at a voltage corresponding thereto.

3. The fiber optic gyro of claim 2, wherein said pulse counting means includes a first comparator and a second comparator that compare an output from said opto-electric converter with predetermined positive and negative thresholds and then issue said positive-going or negative-going pulse when the output of said opto-electric converter exceeds said positive or negative threshold in a positive or negative direction respectively.

4. The fiber optic gyro of claim 2 or 3, wherein said pulse counting means includes gate means wherein when a phase difference between said clockwise propagating light ray and said counterclockwise propagating light ray is zero, a pulse generated in an output of said opto-electric converter is removed in order not to count it.

* * * * *